July 12, 1960
D. M. BARTON ET AL
2,944,396
PROCESS AND APPARATUS FOR COMPLETE
LIQUID-VAPOR PHASE OXIDATION AND
HIGH ENTHALPY VAPOR PRODUCTION
Filed Feb. 9, 1955
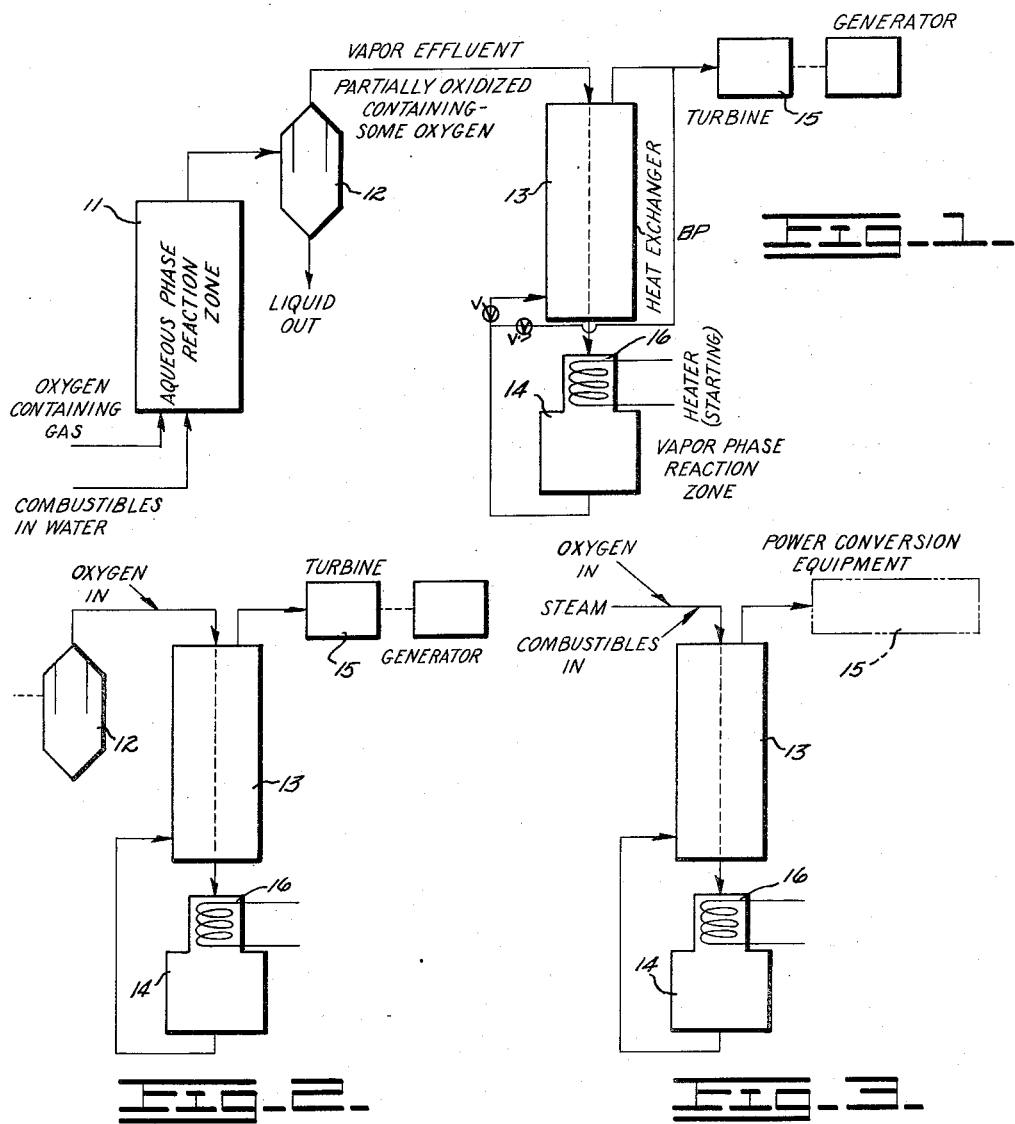
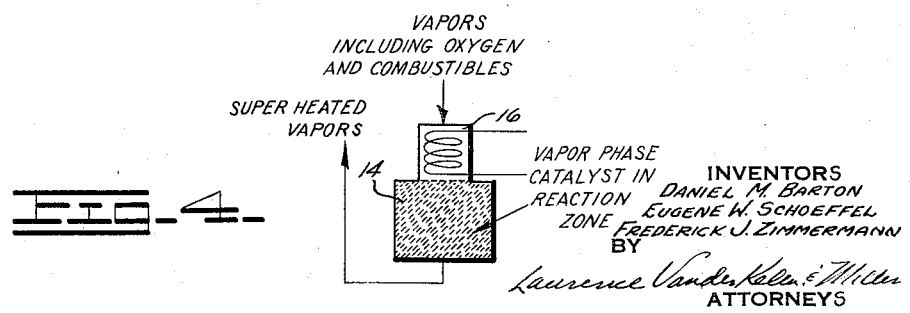
INVENTORS
DANIEL M. BARTON
EUGENE W. SCHOEFFEL
FREDERICK J. ZIMMERMANN
BY
ATTORNEYS

2,944,396

PROCESS AND APPARATUS FOR COMPLETE LIQUID-VAPOR PHASE OXIDATION AND HIGH ENTHALPY VAPOR PRODUCTION

Daniel M. Barton and Eugene W. Schoeffel, Kronenwetter, and Frederick J. Zimmermann, Weston, Wis., assignors to Sterling Drug Inc., New York, N.Y., a corporation of Delaware Filed Feb. 9, 1955, Ser. No. 487,174

8 Claims. (Cl. 60—39.05)

The present invention relates to a process and apparatus for producing high enthalpy completely oxidized vapors from partial oxidation processes. More particularly the present process and apparatus is addressed to enhancing the power characteristics in condensible vapors such as are emitted in the partial oxidation of combustible material dispersed in water.

While the process of Frederick J. Zimmermann, appearing in United States Letters Patent 2,665,249, is directed to substantially complete combustion in the aqueous phase of carbonaceous dispersions, particularly for the elimination of waste materials, it became apparent following the process therein described that a surplus of steam energy occurred as a by-product of the liquid phase oxidation in excess of the amount necessary to render the process self-sustaining. Various attempts were made with varying degrees of success to make the steam available for the conversion of power. Quantities of steam were abundant but the quality of the steam for power production hampered the economic usage thereof in the generation of power. The reason for the lack of quality in the steam relates to one of the problems which the basic process described in United States Letters Patent 2,665,249 sought to solve. It was found necessary that for complete oxidation within specified limits, the combustible materials in aqueous dispersion should remain at least partially in the liquid phase as the oxidation proceeded. This was necessary to prevent drying out of the reactor zone and to assure that no plugging of the equipment would occur. Thus, the effluent vapors from the reaction zone were saturated, in order to maintain aqueous phase oxidation, which limits the temperature of the vapors to ranges below the critical temperature of the steam. So long as the vapors emitted from the reaction zone were substantially saturated there remained enough water at all times in the reaction zone to carry away the insoluble and soluble non-combustible salts and ash. But the maintenance of saturated conditions in the reactor effluent materials did not provide a method of enhancing the steam quality for the purpose of steam-power conversion. While enormous amounts of steam were available from the complete oxidation process, it was not in the most desirable condition for power conversion since the saturated condition was required in the autogenetic aqueous phase process. If the material could be superheated to enhance the enthalpy-poor saturated vapors, then it was conceivable that the energy boost so supplied would make large scale power production from the effluent reaction gases practical.

Various techniques for superheating were tested and found wanting in some serious particular. The use of heat from an external source, when available, reduced the economic potential of the process since the external heat required was both costly and complex to apply. At least all attempts had, in common, the concept of heating the effluent reaction gases after removal from the reactor zone.

While the early experimentation with the process disclosed and claimed in the Zimmermann Letters Patent 2,665,249 contemplated substantially complete oxidation, operation of the equipment sometimes resulted in reactor effluent having a vapor-fuel fraction because of the conditions under which the oxidation was temporarily allowed to proceed. It was then discovered that, under these circumstances, the vapor phase material having a fuel content (and therefore not completely oxidized) entrained therein was a useful material and the present process was devised whereby the fuel fraction in the vapor phase could be utilized with very advantageous results in the power generation field.

While attempting to treat the unoxidized material it was observed that controlled partial oxidation might supply additional heat in order to enhance the enthalpy of material in the vapor stage. This observation was further pursued inasmuch as it was a simple matter to close off the stoichiometric supply of free oxygen-containing gas in the system and obtain an effluent distillation wherein unoxidized combustible vapor mingled with the saturated condensibles in the reactor effluent vapor. Regulation of the temperature and/or pressure or both appeared to have the same effect in adjusting the fuel value of the vapors resulting from the reaction. Oxidation could be regulated and the vapor products contained measured amounts of fuel value.

There remained the matter of applying a simple process which could be integrated with the partial oxidation so as to accomplish superheat and resulting energy enhanced vapors readily adaptable to power conversions by reason of elevated enthalpy. Whereas the basic reaction which produced the saturated fuel-laden vapor was aqueous or liquid phase, any fuel-utilizing second phase would necessarily be vapor phase and would have to accomplish what had long been considered impossible, i.e., self-sustaining vapor phase oxidation wherein the fuel values available in the reactor effluent of partial oxidation were so applied as to accomplish superheat of the same continuous stream of saturated vapors. The present invention supplied that need and it will be seen that reactor effluent from the partial aqueous-phase oxygenation of combustible materials is excited to liberate the entrained fuel values in a manner such as to be self-sustaining and whereby high energy vapor product is made available for power conversion. Further, it will be seen that the process for producing high enthalpy condensible gases accomplishes intimate heat exchange attending the reaction without the intervention of conventional metallic barriers.

Collaterally, it will be observed that substantially complete oxidation is still the end result and that the relatively high conditions of pressure and temperature within the first oxidation zone can be scaled down in any given installation resulting in considerable installation economies.

To accomplish the present process the apparatus necessary is simple and requires only the establishment of a second oxidation zone and an exchange arrangement capable of using a part of the exothermic heat liberated from the second oxidation to elevate the incoming vapor-fuel-oxygen mixture to temperatures at which the entrained combustible vapors oxidize. Where temperature/pressure adjustments are made to cause only partial oxidation in liquid phase, the stoichiometric free oxygen-containing gas, based on complete oxidation, is available to sustain the oxygenating superheat vapor phase oxidation.

In instances where the amount of free oxygen-containing gas is restricted to cause partial liquid phase oxidation, fresh free oxygen-containing gas is entrained in the vapor phase effluent from the liquid phase reaction zone prior to admission to the vapor phase reaction zone. As the vapor phase reaction proceeds, a part of the heat from the oxidation dries or superheats the entrained water vapor and another part of the heat serves continuously to self-initiate oxidation in additional influent vapor phase material continuously introduced to the second reaction zone. This heat, warming the influent fuel-laden vapor, is not lost but is added to the incoming vapor prior to the vapor phase oxidation occurring in the second reaction zone. It will be seen that the operation is thus continuous and co-operative with any autogenetic partial oxidation process which occurs in the aqueous phase. The invention thus contemplates a modified version of the process described in United States Letters Patent 2,665,249 and the addition of a second reaction zone to superheat the saturated effluent vapors from the liquid phase reaction and wherein the second reaction is self-excited and self-sustaining.

It will thus be seen that one of the objects of the present invention is to provide a process and apparatus for the conversion of any partial oxidation process to a complete oxidation process.

A further object of the present invention is to provide a method and apparatus for converting saturated vapors containing vapor phase combustibles to superheat conditions of high enthalpy and having high power conversion quality.

A further object is to accomplish vapor phase oxidation where the vapor phase exothermic reaction occurs without the intervention of metallic heat transfer barriers.

Another object is to provide a self-generating superheat.

A still further object is to provide a method and apparatus for producing a superheated vapor devoid of corrosive properties and which is substantially completely oxidized.

A still further object is to provide a method and apparatus for treating aqueous dispersions of combustible material in such a manner as to produce first a partially oxidized vapor product from a liquid phase reaction and subsequently to produce a fully oxidized superheated vapor product.

These and other objects will become increasingly apparent as the description of the present invention proceeds.

In the drawings:

Figure 1 is a schematic diagram of the present invention showing an aqueous phase partial oxidation wherein a stoichiometric supply of oxygen-containing gas is entrained in the effluent material therefrom and the vapors led to the vapor phase reaction zone.

Figure 2 is a schematic diagram of the present invention showing the insertion of an oxygen-containing gas to partially oxidized vapors before admission to the vapor phase reaction zone.

Figure 3 is a schematic diagram of the present invention showing the entrainment of both combustible material and oxygen-containing gas where the vapor stream is comprised of a substantially completely oxidized material such as steam.

Figure 4 is a schematic diagram of the present invention wherein the vapor phase reaction zone contains a packed catalyst and represents a modification accomplishing a substantial lowering of the oxidation temperature of entrained combustible material.

General description

The preferred embodiment of the present invention comprises withdrawing from a controlled partial oxidation zone a vapor containing at least some partially unoxidized organic material, heating said vaporous material in countercurrent heat exchange relationship with a hot effluent from a second oxidizing zone, passing the so-heated vaporous material into the second oxidizing zone to substantially completely oxidize all of the oxidizable material entrained in the vapors, thereby raising the free energy level and enthalpy of the vapors by direct heat exchange within the vapor phase oxidation zone, passing the substantially completely oxidized high energy level effluent from the second reactor in countercurrent heat exchange relationship with the partially oxidized vaporous material withdrawn from the first reactor (liquid phase) and subsequently recovering as utilizable power the free energy of the substantially completely oxidized material.

In the preferred embodiment of the present invention the conditions within the second oxidation zone are preferably maintained such as to excite and sustain an autogenetic oxidation of the entrained combustible materials while in a vapor state.

Referring with more particularity to the drawings, a vapor-containing partially oxidized organic material in an amount between about 0.1 and about 5 percent combustible material to substantially inert vaporous material is withdrawn from the top of a controlled aqueous phase autogenetic reaction zone 11. A separator 12 is provided which treats the substantially saturated vapor to drop out any liquid. The vaporous effluent from the separator 12 is passed in indirect countercurrent heat exchange relation in a heat exchanger 13 wherein the temperature of the vaporous effluent is raised between about 100 degrees Fahrenheit and about 600 degrees Fahrenheit above its exit temperature from the controlled liquid phase reaction zone. The high temperature vapors are introduced into a second oxidation zone 14 where the exothermic reaction excited in the vapor-phase exchange is liberated. The hot vapors are introduced in such an amount and at such a space velocity than substantially complete oxidation of all of the combustible material will occur during passage through the second reaction zone 14. The hot substantially completely oxidized vapors are withdrawn and passed in indirect countercurrent heat relationship with the unoxidized incoming oxidizable vapors in heat exchanger 13. The temperature drop of the substantially completely oxidized vapors within the exchanger 13 is between about 100 degrees Fahrenheit and about 1000 degrees Fahrenheit. After passage through the heat exchanger 13 the hot substantially completely oxidized vapors are introduced into a power converter 15 wherein the free energy of the vapors is converted into utilizable power. Diagrammatically the power converter shown is a turbine but it will be understood that any well known power converter such as expanders of various types may be used.

In the drawing the single lines entering reactor 11 at the bottom are conduits carrying oxygen containing gas in one and combustibles in water in the other as designated on the drawing. The line connecting reactor 11 to separator 12 and 12 in turn to heat exchanger 13, passing therethrough to heater 14, and from the bottom of the heater 14 to the heat exchanger jacket and from the exit end at the top of the exchanger jacket, or heat exchanger connecting with the bypass, to the power generator, are conduits for conveying the vapors through the apparatus.

It will generally be advisable to introduce oxygen or an oxygen-carrying gas in an amount sufficient to completely oxidize the combustible material prior to the aqueous phase reactor. Control of the oxidation reaction within the aqueous phase oxidation reactor to produce a partial oxidation therein being obtained by regulation of the temperature and/or pressure maintained within the reactor or the delay of unit quantities within the reactor. However, successful operation has been had upon introducing an insufficient amount of oxygen or oxygen-carrying gas into the aqueous phase oxidation reactor; withdrawing an oxygen deficient fuel-laden vapor therefrom and subsequently introducing additional oxygen or oxygen-carrying gas to the vapors prior to the second (vapor phase) oxidation zone. The pressure of the vaporous material withdrawn from the first oxidation zone is preferably between about 150 p.s.i.a. and about 6500 p.s.i.a. The lower pressure conditions produce a higher percentage of entrained unoxidized material in the vapors. The temperature of the vapors withdrawn from the first (aqueous phase) reaction zone will be within the range of about 330 degrees Fahrenheit and about 650 degrees Fahrenheit and will vary directly with the pressure of oxidation. To maintain the aqueous phase character of the first reaction zone the exiting vapor material will be in a substantially saturated state. The preferred temperature/pressure conditions within the first or aqueous phase reactor are between about 800 p.s.i.a. and 6000 p.s.i.a. and between about 330 degrees Fahrenheit and about 650 degrees Fahrenheit.

The reaction conditions within the second or vapor phase oxidation zone are at a temperature above about 330 degrees Fahrenheit and preferably between about 400 degrees Fahrenheit and about 1200 degrees Fahrenheit and at a pressure above about 150 p.s.i.a. and in the range between about 800 p.s.i.a. and 6500 p.s.i.a. The preferred range is about 800–3000 p.s.i.a. Satisfactory operation has occurred at the lower range of temperatures and pressures, but the energy level of the system is correspondingly lower and larger equipment is necessary to convert the free energy to utilizable power.

Where the process described in the United States Letters Patent 2,665,249 was operated at 900 pounds per square inch pressure and the temperature of the effluent from the aqueous reaction material was about 482 degrees Fahrenheit, and where less than stoichiometric amounts of oxygen were admitted to the first reaction zone 11, the saturated vapors were found to contain 0.1–5 percent of combustible materials. Analysis of these vapors indicated that the combustible fraction was composed of the following:

(1) Aldehydes, alcohols, ketones, etc.
(2) Volatile organic material—composition unknown.
(3) Volatile acids such as acetic acid.
Having a COD of about 31.9 grams per liter of condensed water and having a pH of about 3.5.
Where basic material employed in the first reaction zone 11 consisted of waste semi-chemical pulping liquor.

The effluent vapors from the first reaction zone after being mixed with a stoichiometric amount of oxygen-containing gas (air) entered the heat exchanger 13 where it was elevated in temperature to about 842 degrees Fahrenheit and vapor phase oxidation commenced. Vapors exiting from the second reaction zone 14 were at 1034 degrees Fahrenheit. At least a part of the superheated vapor effluent from the second reaction zone 14 was countercurrently heat exchanged against the effluent vapors from the first reaction zone 11 in the heat exchanger 13 where the effluent vapors from the second reaction zone 14 dropped in temperature from about 1034 to about 690 degrees Fahrenheit.

The thus superheated vapor was led to a power conversion unit 15 and the energy delivered was found to exceed the entire input power requirements of the entire process.

Analysis of the exiting superheated vapors from the heat exchanger indicated that no combustible materials were entrained therein and that combustion was substantially complete.

The fuel material originally admitted to the first reaction zone 11 was spent pulping liquor although any finely comminuted combustible material in water such as garbage, sewage, and various liquid industrial wastes have proven amenable to the present process.

It was also fund that exceptionally good superheat and high enthalpy results obtained using the instant equipment and injecting a high fuel value material in vapor phase entrained in stoichiometrically determined oxygen-containing gas. This vapor phase fuel was then reacted in the vapor phase zone as previously indicated to enhance the energy content of the steam or non-condensible vapors. Methane was inserted, for example, in a substantially completely oxidized vapor effluent from an aqueous phase reactor, along with appropriate amounts of oxygen and satisfactory enhancement of the power-laden vapors was observed. Efficiencies probably resulting from the avoidance of metallic heat transfer barriers yielded easily controlled superheat conditions which were observed to better any attempted external heat as a superheat source.

Vapor phase acetic acid served equally well in the vapor phase reactor where the ultimate temperature of the steam and non-condensibles was elevated to superheat conditions.

It is believed that vapor phase oxidation occurs in the second reaction zone when the vapor phase combustible reaches a thermal condition approximating the ignition point of the entrained combustibles. When such point has been achieved oxidation occurs when at least stoichiometric amounts of free oxygen-containing gas are present. The present invention thus provides a self-sustaining means and method for accomplishing the thermal elevation necessary to reach such ignition temperatures while providing superheated exiting vapors. Where it is desirable to lower the ignition or combustion point of the entrained fuels, various catalysts may be inserted in the second reaction zone. With the insertion of such oxidation enhancing catalysts, the temperature of the effluent material from the first reaction zone can be lowered and less exothermic heat need be utilized for elevating the temperature of the effluent to combustion conditions, or both.

The particular catalysts which are operative to lower the ignition or combustion point of the entrained fuels are quite varied as to composition. Both the adsorption or surface active types and the metallic types appear to be useful. Representative catalysts which are suitable include, for example, surface active catalysts such as stainless steel, tool steel, and other kinds of steel in pellets, shavings and wire, activated silica compounds as used in petroleum catalytic crackers, silica gel, floridan earth, kieselguhr, etc.; that is, a material presenting a rather large surface area and not poisoned to the oxidation reaction described herein; metals, metallic oxides and alloys containing these metals including, for example, osmium, platinum, palladium, cobalt, iron, nickel, chromium, copper, et cetera, that is, a metal or metallic material stable at the reaction conditions. Where the high pressure and temperature gases from the reaction are to be passed through a turbine or other energy collecting device, the choice of catalyst may be narrowed because certain of the materials will be broken down by the high temperatures and pressures employed. These break-down materials may cause considerable damage to turbines or other devices, and care should be used in the selection of the particular catalyst for this reason.

While the process herein described becomes self-sustaining after it is once initiated, the starting of the second reaction zone necessitates the insertion of sufficient initiating heat to elevate the temperature of the vapor from the first reaction zone 11 to at least the ignition or combustion point of the entrained fuel. This is accomplished by a heater 16. The heater supplies sufficient heat to start the oxidation in the second reaction zone 14. Once the oxidation has proceeded the exothermic heat available from the oxidation of the combustibles, in the presence of stoichiometric amounts of oxygen, is sufficient to satisfactorily elevate the effluent vapors from the first reaction zone 11 to vapor phase combustion temperature and provide directly exchanged superheat to the effluent vapors from the second reaction zone 14. The outside heat from the heater 16 is no longer required and the heater 16 may be turned off. While the heater illustrated is electric, it will be understood that any convenient outside heat may be employed for bringing the effluent vapors from the first reaction zone 11 to vapor-phase combustion conditions.

A by-pass BP, as shown in Figure 1, is employed to shunt superheated vapor around the exchanger 13, where desired. In this manner the superheated vapors from the second reaction zone 14 are led directly to the power conversion equipment. Such an arrangement renders design considerations in exchanger 13 less critical since the amount of heat necessary in exchanger 13 can be readily regulated. When such by-pass is utilized the valves V and V' (shown in phantom line) are employed for adjusting the flow.

The following symbolic notes, ignoring radiation and conduction losses, indicates the heat balance conditions believed to exist in the described process and apparatus where $R_{V1}$ is the heat (actual $H_{T1}$ and potential $H_{C1}$) in the effluent vapors from the first reactor 11. $\Delta H_{EX}$ represents the amount of heat added to the effluent vapors from the first reactor 11 to excite vapor phase oxidation and $R_{V2}$ symbolizes the heat conditions of the effluent exiting from the second reaction zone 14. It will be noted that the $\Delta H_{EX}$ is still included in the $R_{V2}$ value and is exchanged in the heat exchanger 13 to elevate $R_{V1}$ to the thermal conditions for liberation of the potential heat $H_{C1}$ in the entrained combustible material.

Analysis of the superheated vapors after the second reaction zone 14 indicated the presence of nitrogen, small quantities of oxygen, carbon dioxide, and substantial quantities of water vapor. No combustible material was found in the effluent from the second reaction zone 14 indicating that the reaction in the second reaction zone 14 had removed all oxidizable material. In the operation of power conversion units from the superheated vapors no unusual corrosion was observed.

$R_{V1} = H_{T1} + (H_{C1}$ potential$)$
$R_{V1} + \Delta H_{EX} =$ conditions in exchanger where:
$\Delta H_{EX} =$ heat necessary to cause vapor phase oxidation liberating $H_{C1}$
$R_{V2} = R_{V1} + \Delta H_{EX}$
$H_T = H_{T1} + H_{C1} = R_{V1}$ (where $H_T$ represents the heat value at entry to energy converter and $H_{C1} =$ liberated heat)

Thus, the $H_{C1}$, or heat value of the entrained fuel contributes the superheat obtainable in the entry vapors to any energy conversion equipment.

When utilized in conjunction with the apparatus for accomplishing aqueous phase oxidation it was found that a much more satisfactory power operation was obtained in that superheat conditions were obtained in the vapors led to suitable turbines or expanders.

Having thus described the apparatus and process for superheating vapor phase combustibles making possible enhanced energy-laden vapors for power conversion, it will be understood that certain modifications may be made within known skills and that such modifications are intended to be included in the claims unless the claims themselves negate such inclusion.

We claim.

1. In a self-sustaining process for superheating vapors, the steps which include: entraining combustibles in a vapor stream containing sufficient oxygen-containing gas to supply at least the stoichiometric oxygen demand of the combustibles; elevating the temperature of said vapor stream with entrained combustibles and oxygen-containing gas to a point at which complete oxidation occurs, causing superheat of the vapor stream; cycling at least a part of the thus produced superheated vapors in countercurrent heat exchange relation with the said vapor stream carrying the entrained combustibles and oxygen-containing gas; and withdrawing the balance of superheated vapor for power conversion.

2. In a self-sustaining process for producing superheated vapors from an aqueous phase partial oxidation, the steps which include: passing saturated effluent vapors having a combustible material entrained therein and oxygen in stoichiometric amount sufficient to completely oxidize the combustibles through a heat exchanger; elevating the temperature of said vapor effluent, combustibles, and oxygen to a temperature sufficient to liberate the potential heat in said combustibles thereby superheating the total vapors; cycling said superheated vapors in countercurrent heat exchange relation with the incoming saturated vapors to elevate the combustibles entrained therein to combustion temperatures; converting the remainder of said superheated vapors to power in excess of the power demands of the entire system.

3. In a self-sustaining process for producing superheated vapors from an aqueous phase partial oxidation, the steps which include: removing saturated partially oxidized vapors effluent from an aqueous phase partial oxidation; admixing an oxygen-containing gas with said effluent in stoichiometric amounts at least equal to the amount required to complete the oxidation of vapor phase combustibles entrained in the partially oxidized vapors; elevating the temperature of said vapors, vapor-phase combustibles, and oxygen-containing gas to a temperature at which oxidation of the combustibles occurs; withdrawing from the vapor phase second oxidation zone completely oxidized combustible free superheated vapors; passing said superheated vapors in countercurrent heat exchange relationship with the incoming partially oxidized vapors; utilizing the balance of said superheated vapors for power conversion.

4. In a process for superheating saturated vapors the steps which include: withdrawing from a controlled partial oxidation zone a vapor containing at least some partially unoxidized combustible material, heating said vaporous material in countercurrent heat exchange relationship with a hot effluent from a second oxidizing zone, passing the so-heated vaporous material into a second oxidizing zone so as to substantially completely oxidize all of the oxidizable material entrained in the vapors, thereby raising the free energy level of the vapors by direct heat exchange within the second oxidation zone, passing the substantially completely oxidized and combustible free high energy level effluent from the second reaction zone in countercurrent heat exchange relationship with the partially oxidized vaporous material withdrawn from the first reaction zone and subsequently recovering as utilizable power the free energy of the substantially completely oxidized material.

5. In a method for superheating vapors the steps which include: passing a vapor containing between about 0.1 and about 5 percent combustible material entrained therein in indirect heat exchange relationship with a hot vapor from a subsequent reaction zone; introducing said heated vapor into a surface active oxidation carrier material packed reaction zone; substantially completely oxidizing the combustibles in said vapors; and passing the products of reaction in heat exchange with said incoming combustible entrained vapor.

6. In a method for superheating vapors the steps which include: passing a vapor containing between about 0.1 and about 5 percent combustible material entrained therein in indirect heat exchange relationship with a hot vapor from a subsequent reaction zone; introducing said heated vapor into an oxidation catalyst charged reaction zone; substantially completely oxidizing the combustibles in said vapors; and passing the products of reaction in heat exchange relation with said incoming combustible entrained vapor.

7. In an apparatus for superheating vapors to enhance their power, the combination including: a first liquid phase oxidation reactor; a separator connected to the effluent line of said liquid phase reactor; a vapor line from said separator; a heat exchanger through which said vapor line passes and having a heating jacket surrounding said vapor line and said vapor line connecting with and discharging into a second catalytic oxidation reactor for vapor phase reaction; an exhaust line from said vapor phase reactor carrying superheated vapor to and through the said heat exchanger in countercurrent heat exchanger relation to said vapor line; and power conversion apparatus connected to a discharge line from said heating jacket of said heat exchanger and receiving the exited vapors from said exchanger.

8. In an apparatus substantially as described in claim 7 including: a regulated by-pass around said heat exchanger leading from said exhaust line to said power conversion apparatus.

References Cited in the file of this patent

UNITED STATES PATENTS

| | | |
|---|---|---|
| 1,571,962 | Overton | Feb. 9, 1926 |
| 2,032,391 | Armacost | Mar. 3, 1936 |
| 2,076,480 | Rees | Apr. 6, 1937 |
| 2,643,519 | Powell | June 30, 1953 |
| 2,665,249 | Zimmermann | Jan. 5, 1954 |
| 2,677,235 | Secord | May 4, 1954 |
| 2,690,425 | Moses et al. | Sept. 28, 1954 |
| 2,773,026 | Cederquist | Dec. 4, 1956 |
| 2,824,058 | Zimmermann | Feb. 18, 1958 |

FOREIGN PATENTS

| | | |
|---|---|---|
| 271,899 | Great Britain | Aug. 18, 1927 |